(12) United States Patent
Bongiovanni et al.

(10) Patent No.: US 7,318,105 B1
(45) Date of Patent: Jan. 8, 2008

(54) DYNAMICALLY DETECTING TOPOLOGY AND EGRESS NODES IN COMMUNICATION NETWORKS

(75) Inventors: Kevin Paul Bongiovanni, Portsmouth, RI (US); David Bruce Cousins, Barrington, RI (US)

(73) Assignee: BBN Technologies Corp., Cambridge, MA (US)

( * ) Notice: Subject to any disclaimer, the term of this patent is extended or adjusted under 35 U.S.C. 154(b) by 874 days.

(21) Appl. No.: 10/385,782

(22) Filed: Mar. 11, 2003

(51) Int. Cl.
*G06F 15/173* (2006.01)
(52) U.S. Cl. .................. 709/238; 709/242; 709/224
(58) Field of Classification Search ............... None
See application file for complete search history.

(56) References Cited

U.S. PATENT DOCUMENTS

| | | | |
|---|---|---|---|
| 5,596,719 A | 1/1997 | Ramakrishnan et al. | |
| 5,751,967 A * | 5/1998 | Raab et al. | 709/228 |
| 6,195,622 B1 * | 2/2001 | Altschuler et al. | 703/2 |
| 6,453,345 B2 | 9/2002 | Trcka et al. | |
| 6,574,669 B1 * | 6/2003 | Weaver | 709/239 |
| 6,839,754 B2 * | 1/2005 | Nowak et al. | 709/224 |
| 6,981,055 B1 * | 12/2005 | Ahuja et al. | 709/238 |
| 7,089,428 B2 | 8/2006 | Farley et al. | |
| 2003/0028662 A1 | 2/2003 | Rowley et al. | |
| 2003/0145110 A1 | 7/2003 | Ohnishi et al. | |
| 2003/0182431 A1 | 9/2003 | Sturniolo et al. | |
| 2005/0286414 A1 | 12/2005 | Young et al. | |
| 2002/0080967 A1 | 6/2007 | Abdo et al. | |

* cited by examiner

*Primary Examiner*—John B. Walsh
(74) *Attorney, Agent, or Firm*—Ropes & Gray LLP

(57) ABSTRACT

A method of determining routing information among nodes [210] in a network [200] may include obtaining a set of times of arrival [410] and corresponding source nodes [420] for chunks of data in the network [200] and assigning weights to a set of chunks of data [520-550] based on respective times between the set of chunks of data [520-550] and one chunk of data [510]. A set of routing information [600/800] among the nodes in the network [200] may be updated based on the assigned weights.

21 Claims, 7 Drawing Sheets

| Time | Source Node | Size/Duration |
|---|---|---|
| 50.001643 | 2 | 40 |
| 50.005243 | 1 | 1000 |
| 50.012309 | 2 | 40 |
| 50.015909 | 1 | 1000 |
| 50.022976 | 2 | 40 |
| 50.026576 | 1 | 1000 |
| 50.033643 | 2 | 40 |
| 50.037243 | 1 | 1000 |
| 50.044309 | 2 | 40 |
| 50.047909 | 1 | 1000 |
| 50.054976 | 2 | 40 |
| 50.058576 | 1 | 1000 |
| 50.060309 | 2 | 40 |
| 50.063909 | 1 | 1000 |
| 50.070976 | 2 | 40 |
| 50.074576 | 1 | 1000 |
| 50.081643 | 2 | 40 |
| 50.085243 | 1 | 1000 |
| 50.092309 | 2 | 40 |
| 50.095909 | 1 | 1000 |
| 50.102976 | 2 | 40 |

410 Time · 420 Source Node · 430 Size/Duration · 400

Fig. 4

$$P = \begin{bmatrix} 0 & p_{1,2} & \cdots & p_{1,n} \\ p_{2,1} & 0 & \cdots & p_{2,n} \\ \vdots & \vdots & \ddots & \vdots \\ p_{n,1} & \cdots & \cdots & 0 \end{bmatrix}$$

Fig. 6

$$P_e = \begin{bmatrix} 0 & p_{1,2} & \cdots & p_{1,n} & p_{1,(n+1)} \\ p_{2,1} & 0 & \cdots & p_{2,n} & p_{2,(n+1)} \\ \vdots & \vdots & \ddots & \vdots & \vdots \\ p_{n,1} & \cdots & \cdots & 0 & p_{n,(n+1)} \end{bmatrix}$$

Fig. 8

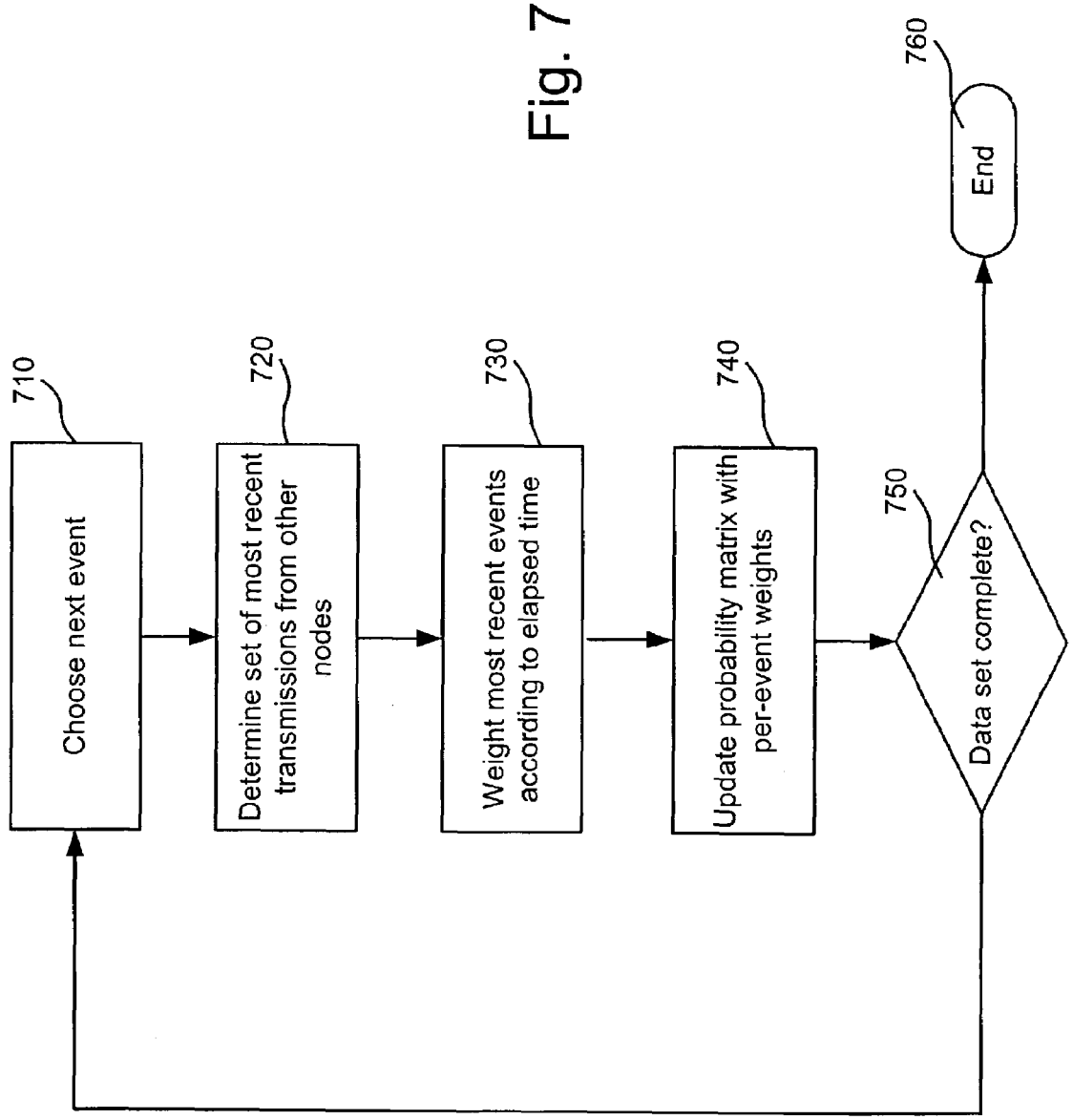

US 7,318,105 B1

DYNAMICALLY DETECTING TOPOLOGY AND EGRESS NODES IN COMMUNICATION NETWORKS

GOVERNMENT INTEREST

The invention described herein was made with government support. The U.S. Government may have certain rights in the invention, as provided by the terms of contract No. MDA972-01-C-0080, awarded by the Defense Advanced Research Projects Agency (DARPA).

BACKGROUND OF THE INVENTION

1. Field of the Invention

The present invention relates generally to communication networks, and more specifically, to the discovery of routes used by data transmitted over such networks.

2. Description of Related Art

Communication networks typically include a number of interconnected communication devices. Connections among the devices in some communication networks are accomplished through physical wires or optical links. Such networks may be referred to as "wired" networks. Connections among the devices in other communication networks are accomplished through radio, infrared, or other wireless links. Such networks may be referred to as "wireless" networks.

Communication messages (e.g., chunks of data, such as data packets) sent across communication networks may be intercepted. Intercepted messages may yield valuable information, and the process of intercepting and analyzing messages may be referred to as "traffic analysis." In general, traffic analysis seeks to understand something about the message traffic by passively observing the traffic and analyzing that traffic to extract information. To guard against unwanted traffic analysis, messages are typically encrypted. For example, both the content and the destination of a message could be obscured through encryption.

In some situations, however, it may still be desirable to monitor traffic flow and discover routes used in a communication network (i.e., the "topology" of the network). Accordingly, there is a need to monitor traffic flow and discover routes even when identifying information associated with the messages is encrypted.

SUMMARY OF THE INVENTION

Methods and systems consistent with the present invention address this and other needs by discovering network topology by examining elapsed times between the arrival of one chunk of information and the most recent chunk arrivals from other nodes on a per-event basis. The most recent chunk arrivals from the other nodes may be weighted so that more recent chunks are weighted higher than less recent chunks.

In accordance with one purpose of the invention as embodied and broadly described herein, a method of determining topology of a network may include obtaining a data set including times of arrival, durations, and source nodes for chunks of data in the network. Most recent chunks of data before a chunk arrival time associated with a source node of interest may be identified for source nodes other than the source node of interest. Weights for the other source nodes may be calculated based on time differences between the chunk arrival time associated with the source node of interest and the arrival time of the most recent chunks of data. A probability matrix may be updated based on the weights for the other source nodes. The method may also include repeating the identifying, calculating, and updating acts for other times of arrival and associated source nodes of interest in the data set. The topology of the network may be determined from the probability matrix.

In another implementation consistent with the present invention, a method of determining routing information among nodes in a network may include obtaining a set of times of arrival and corresponding source nodes for chunks of data in the network and determining intervening times between one chunk of data from one node and recently arriving chunks of data from other nodes. Routing probabilities between the one node and the other nodes may be generated using the intervening times.

In a further implementation consistent with the present invention, a method of determining routing information among nodes in a network may include obtaining times of arrival and corresponding source nodes for chunks of data in the network and assigning weights to a set of chunks of data based on respective times between the set of chunks of data and one chunk of data. A set of routing information among the nodes in the network may be updated based on the assigned weights.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 4 is an exemplary tracefile according to an implementation consistent with the present invention;

FIG. 6 illustrates a cumulative probability matrix among nodes in the network of FIG. 2;

FIG. 7 illustrates exemplary iterative processing to generate and update the cumulative probability matrix of FIG. 6; and FIG. 8 illustrates a cumulative probability matrix including egress probabilities among nodes in the network of FIG. 2.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Methods and systems consistent with the principles of the invention may discover network topology by examining elapsed times between the arrival of one chunk of information and the most recent chunk arrivals from other nodes on a per-event basis. The most recent chunk arrivals from the other nodes may be weighted so that more recent chunks are weighted higher than less recent chunks.

Exemplary Wired Network

Figure 1:
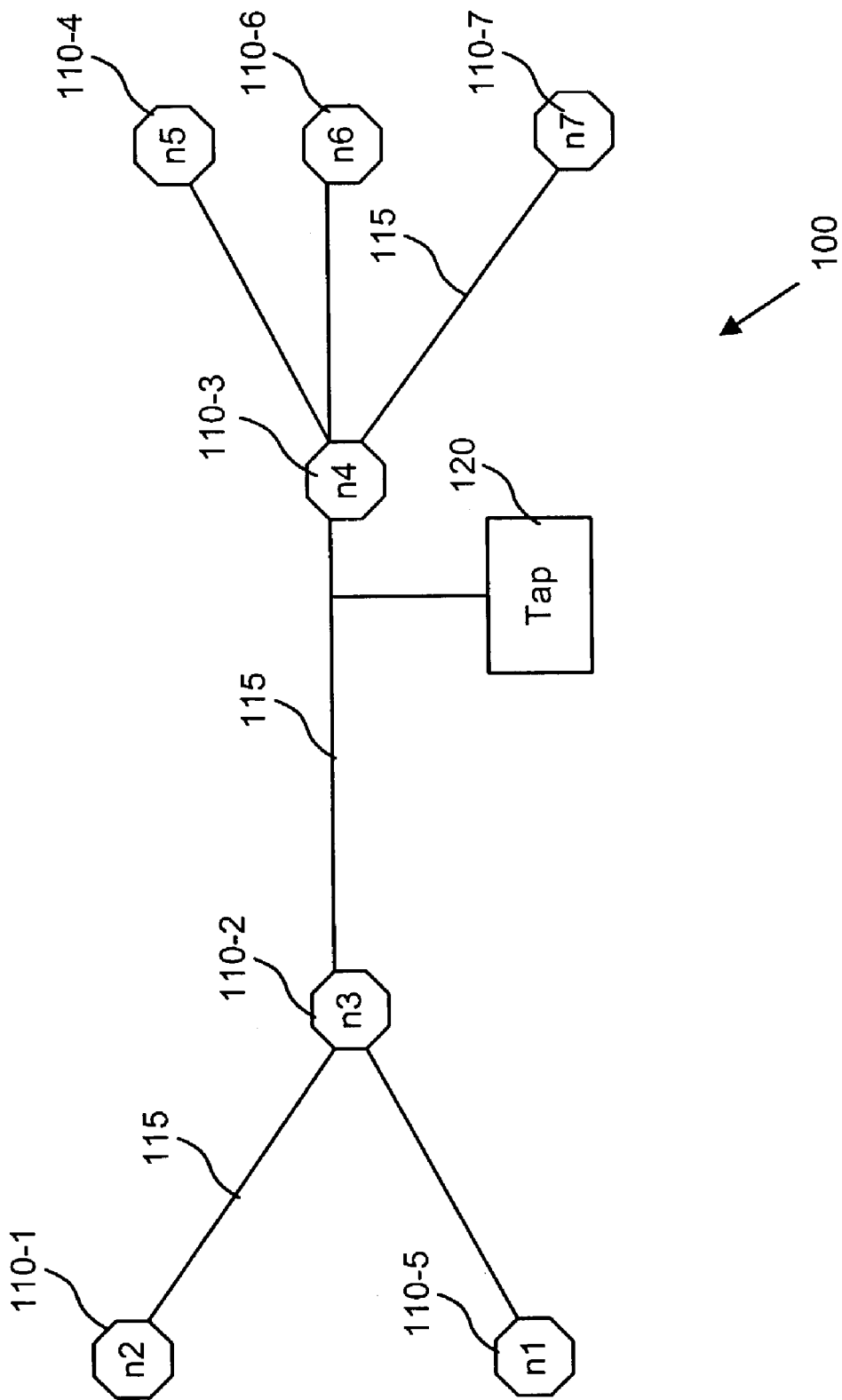
FIG. 1 is a diagram illustrating an exemplary wired network and tap according to an implementation consistent with the present invention.

FIG. 1 is a diagram illustrating an exemplary wired network 100 according to an implementation consistent with the present invention. The wired network 100 may include a number of network nodes 110-1 . . . 110-n (collectively "nodes 110") connected by a number of network links 115. The wired network 100 may also include one or more network taps 120. Although seven nodes 110 and one tap 120 are shown connected in a particular configuration, this is purely exemplary. Wired network 100 may include any number and configuration of nodes 110, links 115, and taps 120.

Network nodes 110 may be configured to send and receive information according to a communication protocol, such as TCP/IP. Although not specifically shown, some nodes 110 may be configured to generate a route for information to a specified destination. Other nodes 110 may be configured to send the information according to a previously-determined route. The network nodes 110 may communicate via discrete "chunks" of data that are transmitted by "senders" 110. A chunk may be any individually detectable or distinguishable unit of data. A listening device, such as tap 120, may determine when a chunk starts and ends. A chunk of data need not exactly correspond to a packet of data. A chunk may represent part of a packet (e.g., a fragment or an ATM cell of an AAL5 PDU), or multiple packets (e.g., two packets concatenated).

Chunks of data may be transmitted by "senders" 110. A sender 110 may be the most-recent node 110 to transmit a particular chunk (e.g., node n3 in FIG. 1, if the tap 120 intercepts a chunk transmitted to node n4). The sender 110 is not necessarily the node 110 that originated the chunk.

Network links 115 may include electronic links (e.g., wires or coaxial cables) and optical links (e.g., fiber optic cables). These links 115 may provide a connection between two nodes 110 (e.g., nodes n1 and n3). It may be possible to physically tap into these links 115 to observe the information carried on them.

Network tap 120 is a device that may intercept chunk transmissions on the network 100. The tap 120 may include a physical connection to a corresponding link 115 and circuitry to detect chunks of data on the link 115. The tap 120 may intercept chunks at a physical layer, a link layer, a network layer, or at higher layers of the network 100 being monitored. The layer at which interceptions occur is within the abilities of those skilled in the art, and may be chosen based on knowledge of, and access to, the network links 115. The tap 120 may include, for example, a transceiver for sensing the chunks of data and may also include other circuitry (e.g., clock circuitry) for determining times of arrival and duration of the chunks. The tap 120 may include a processor for computing any other information associated with the chunks, such as information contained within a header of the chunk of data (e.g., identity of a sending node and/or receiving node).

Tap 120 may observe traffic on the link 115 between nodes n3 and n4. Tap 120 may record information about all the chunks that it observes in a "tracefile." The tracefile may contain a minimum amount of information for each observed chunk. For example, the information may include the time the chunk was seen and the identity of the sender 110 of the chunk. The identity of the sender 110 may include, for example, the IP address of an IPsec gateway, the upstream or downstream transmitter on the point-to-point link 115, or "the same sender 110 as the one that also sent these other chunks." If available, the tracefile may also include additional information about the length or duration of the chunk, the destination node 110, or any insight into the contents of the chunk. Other information that may be available is the location of the tap 120 along the link 115 relative to the nodes 110 at either end of the link 115.

Tap 120 may not capture all traffic on the link 115. For example, tap 120 may occasionally make an error and mistakenly believe it has seen a chunk when no chunk was sent (e.g., due to bit errors on wired network 100). If transmissions are missed, false transmissions are detected, or if a sender 110 is misclassified, these events may be viewed as adding noise to the signals generated by the tap 120. Other sources of noise in the signal generated by the tap 120 may include interference from other signals (e.g., packets belonging to another flow, or jitter in timing due to sharing of a bottleneck among multiple flows).

Tap 120 may listen passively and may not participate in network 100 at the MAC (or higher) layers. In some cases, for example with 802.3 LANs, it is possible for the tap 120 to snoop at the MAC layer and extract some information about higher layer protocols. In the case of SONET networks, however, little or no information may be available about the MAC or higher layer protocols. Such passive listening may also be referred to as covert information collection.

Although a single tap 120 is shown in FIG. 1, wired network 100 may contain many taps 120, which may be interconnected. Taps 120 may work independently using purely local information. Distributed algorithms may allow sharing of information among taps 120. In such a case, taps 120 may have a globally synchronized clock that allows information from multiple taps 120 to be combined. A clock resolution of the taps 120 may be finer than the data sampling resolution of the taps 120, so that information about transmissions (e.g., the start time, duration, inter-transmission gap, and even the presence of short transmissions) is not missed.

A tap 120 (or a network of taps 120) should store the transmissions that it detects for a sufficient amount of time. For example, the round-trip time of a transport layer flow cannot be determined if the history that may be stored at tap 120 is less than one roundtrip time. The total volume of data that is stored depends on the capacity of the link 115 and the maximum round-trip time of flows seen on the link 115. Taps 120 may assign a unique identifier to each sender 110, for example, based on the address of the IPsec gateway. Taps 120 in the network 100 may assign the same unique identifier to any given sender 110.

Exemplary Wireless Network

Figure 2:
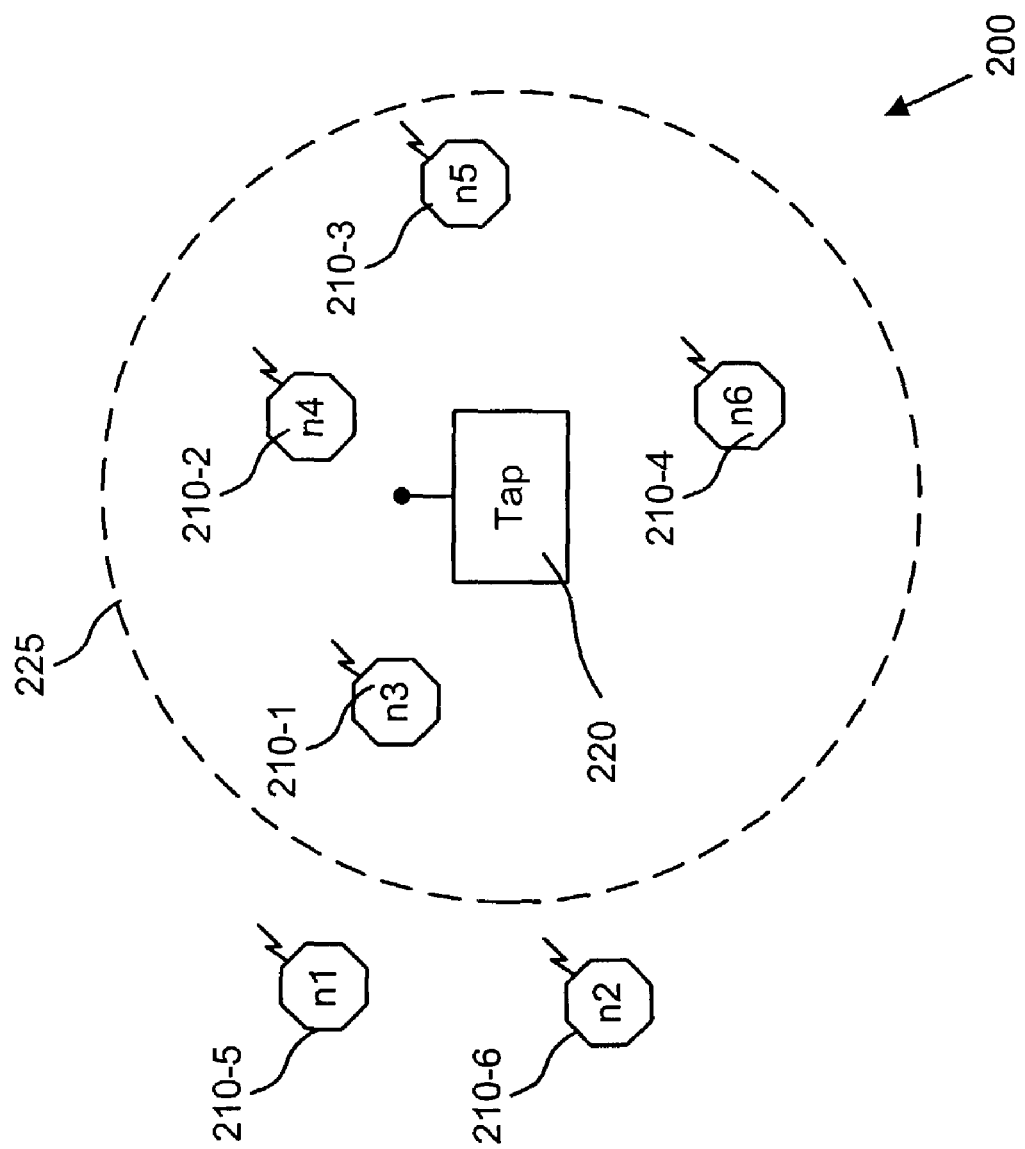
FIG. 2 is a diagram illustrating an exemplary wireless network and tap according to an implementation consistent with the present invention.

FIG. 2 is a diagram illustrating an exemplary wireless network 200 according to an implementation consistent with the present invention. The wireless network 200 may include a number of wireless nodes 210-1 . . . 210-n (collectively "wireless nodes 210") and one or more wireless taps 220. The wireless nodes 210 may communicate via wireless transmission, either point-to-point or, more typically, broadcast transmission. The wireless tap 220 may have an associated area 225 in which it may be able to intercept wireless transmissions.

Although six nodes 210 and one tap 220 are shown in FIG. 2, this is purely exemplary. Wireless network 200 may include any number and configuration of nodes 210 and taps 220. The behavior and operation of the wireless nodes 210 and the wireless tap 220, where similar to the network nodes 110 and tap 120 described above, will not be repeated.

Wireless nodes 210 may communicate via chunks of data that are transmitted by senders 210. Senders 210 may transmit using various types of wireless physical layers, such as terrestrial RP, satellite bands, and free space optical. Nodes 210 may be, for example, radio routers or client radios in the wireless network 200.

Wireless tap 220 is a device that may intercept wireless transmissions on the network 200. Unlike tap 120, which may detect chunks of data only on a certain link 115, wireless tap 220 may observe some (potentially very large) fraction of the wireless spectrum, and thus may see transmissions from a wide range of senders 220. As shown in FIG. 2, tap 220 may have a limited effective reception range. Dashed line 225 indicates an effective reception area through which tap 220 may receive communications from the nodes. As shown, nodes n1 and n2 are out of the effective reception area and will not be monitored by tap 220. Nodes n3-n6, which are within the range 225, may be monitored by tap 220. The tap 220 may include, for example, a transceiver for sensing the chunks of data and may also include other circuitry (e.g., clock circuitry) for determining times of arrival and duration of the chunks. The tap 220 may include a processor for computing any other information associated with the chunks, such as information contained within physical characteristics of the chunk of data (e.g., the identity of a sending or receiving node).

Wireless tap 220 also may record information about all the chunks that it observes in a tracefile. The tracefile may contain a minimum amount of information for each observed chunk. For example, the information may include the time the chunk was seen and the identity of the sender 210 of the chunk. The identity of the sender 210 may include, for example, an RF signature, the location of a radio transmitter 210, or "the same sender 210 as the one that also sent these other chunks." If available, the tracefile may also include additional information about the length or duration of the chunk, the destination node 210, or any insight into the contents of the chunk. Other information that may be available is the geographic location of the tap 220, as determined by, for example, a global positioning system (GPS) receiver.

Tap 220 may not capture all traffic within its range 225. For example, reception on the wireless network 200 may be variable due to environment, noise, transmission power, or jamming such that a tap is unable to observe some transmissions. Furthermore, tap 220 may occasionally make an error and mistakenly believe it has seen a chunk when no chunk was sent (again due to noise on a wireless network). If transmissions are missed, false transmissions are detected, or if a sender 210 is misclassified, these events may be viewed as adding noise to the signals generated by the tap 220. Other sources of noise in the signal generated by the tap 220 may include interference from other signals (e.g., packets belonging to another flow, or jitter in timing due to sharing of a bottleneck among multiple flows).

Tap 220 may listen passively and may not participate in the monitored network 200 at the MAC (or higher) layers. In some cases, for example with 802.11b LANs, it is possible for the tap 220 to snoop at the MAC layer and extract some information about higher layer protocols. In the case of tactical ad hoc networks, however, little or no information may be available about the MAC or higher layer protocols. Such passive listening may also be referred to as covert information collection.

Although a single tap 220 is shown in FIG. 2, wireless network 200 may contain many taps 220, which may be interconnected. In general, the number of taps 220 placed in network 200 is determined by the desired coverage level of network 200. Taps 220 may work independently using purely local information. Distributed algorithms may allow sharing of information among taps 220. In such a case, taps 220 may have a globally synchronized clock that allows information from multiple taps 220 to be combined. A clock resolution of the taps 220 may be finer than the data sampling resolution of the taps 220, so that information about transmissions (e.g., the start time, duration, inter-transmission gap, and even the presence of short transmissions) is not missed.

In the presence of mobile nodes 210 (for example, in ad hoc wireless networks or Mobile IP), taps 220 may, but need not, be mobile. Taps 220 may be placed randomly over a specified geographic area, or in a pattern. Alternately, taps 220 may be placed near respective senders 210. Senders 210 can move into or out of range of one or more taps 220. Senders 210 typically may dwell in the range of one or more taps 220 long enough for transmissions to be observed, and the sources identified and recorded. Taps 220 may assign a unique identifier to each sender 210, for example, based on their RF signature. Taps 220 in the network 200 may assign the same unique identifier to any given sender 210.

Exemplary Topology Discovery Processing

The topology discovery processing described below is primarily applicable to wireless networks 200, so the discussion will be described with respect to wireless networks 200. The techniques discussed herein, however, are not limited to such wireless networks 200, and also may be applied to wired networks 100.

Figure 3:
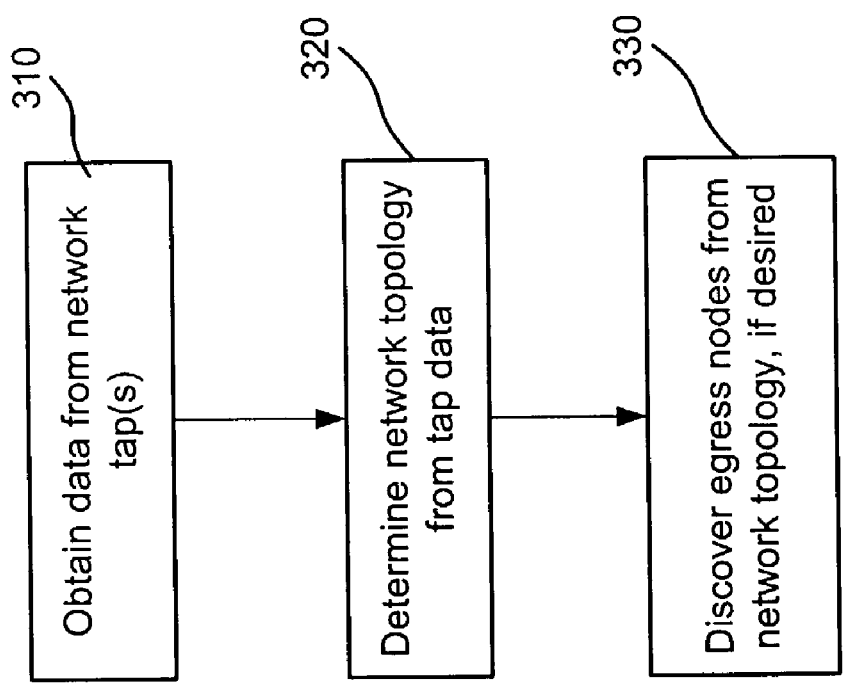
FIG. 3 is an exemplary flow chart of network topology discovery processing in the network of FIG. 2.

1. Obtain Tap Data:

FIG. 3 is an exemplary flow chart of route discovery processing in networks 200. Processing may begin with one or more taps 220 obtaining data from its respective network 200 [act 310]. The tap(s) 220 may obtain data over a period of time, and may store this tap data in a tracefile. The tracefile may represent discrete events, namely a sequence of events associated with different times. The tracefile may include other information (e.g., sender information) associated with the events.

FIG. 4 illustrates an exemplary tracefile 400 according to an implementation consistent with the principles of the invention. Tracefile 400 may include times of arrival 410 of chunks of data (e.g., packets). Tracefile 400 also may include for each chunk arrival one or more of a source node of the chunk 420 and a size/duration of the chunk 430.

The time of arrival 410 may be based on when the tap 220 sensed the leading edge of a chunk of data. Although its information content may be limited, a signal relating to traffic flow may be derived using solely time of arrival information 410. The presence of additional information (e.g., 420, 430) may allow the generation of additional signals and/or signals with more robust information content.

Another piece of information that the tap 220 may obtain is identification of the source node 420 which sent the chunk of data. The identity (or address) of the source node 420 may be obtained even if the chunk of data is otherwise encrypted. A wireless tap 220 may obtain, for example, data including the time of arrival 410, the source node 420, and the size/duration 430 of chunks of data.

One additional piece of information that the tap 220 may obtain is the size/duration 430 of a chunk of data. The tap may measure a length of time (i.e., duration) when data is present after it first sees the chunk. This duration 430 may be converted into a size (e.g., a certain number of bytes) by observing segmentation in the chunk of data. Alternately, the tap 220 may estimate the size 430 of a chunk of data by measuring a clock-time duration of when the chunk is present and by multiplying the duration by a bandwidth of the wired or wireless link over which the chunk travels.

Although designated as nodes "1" and "2" in FIG. 4, the addresses 420 of the source node may be IP addresses, formatted according to a version of an internet protocol (e.g., IPv4). Alternately these addresses 420 may be, for example, in the wired case, just an indication of which direction on the wire the received chunk of data was traveling.

The tap 120/220 may, if available, obtain other information from intercepted chunks of data, such as any field from an IP header associated with the chunk of data, a destination node for the data, and/or a type of the data chuck. In a wireless network (e.g., 200), the tap 220 may also determine a signal strength of a chunk of data. Those skilled in the art will appreciate additional information in addition to the above examples may be directly or indirectly obtained by tap 120/220. For the topology discovery processing described herein, however, the time of arrival information 410, identification of the source node 420, and size/duration 430 of a chunk of data may be sufficient information with which to discover the topology of network 200

2. Determine Network Topology:

Returning to FIG. 3, either the tap 120/220 or an associated (possibly central) processor (not shown) may determine the topology (i.e., connections among nodes 210) of network 200 from the tap data in all tracefiles (or a single tracefile) for a period of time [act 320]. A single tracefile may provide the "local" topology that may be sensed from a single tap 220. By contrast, the aggregation of all tracefiles from all taps 220 in the network 200 may contain much more sensed network traffic within a given time period (and area, due to the geographical sensitivity limitations of taps 220).

The underlying approach for topology discovery is based on fundamental assumptions about the recorded traffic flows, from the perspective of a given event (i.e. packet transmission). Observation and experimentation with tracefiles 400 produced the following two characteristics of wireless traffic flow structure from a tap 220's perspective. First, the likelihood of an event (a recorded entry in the trace file) being a response to a prior event decreases as the elapsed time between the two events increases. Second, the inter-arrival times between a fixed event and any other event may be modeled as being Poisson distributed.

The first characteristic may be seen as a direct consequence of causality (i.e., in networks, transmissions are generally in response to other transmissions) with the added stipulation that a network tries to operate efficiently. Loosely speaking, related packets are expected to be located temporally closer than unrelated ones.

By experimentation and observation, it has been determined that the second characteristic (i.e., that a stationary time series assumption is valid) holds when the so-called Hurst parameter is less than 0.5. Those skilled in the signal processing arts will understand how to measure and quantify the Hurst parameter for tracefile data. In practical application, tracefile data should not be aggregated beyond a relatively short time, such as about 4 ms. For such tracefile data, the use of a constant Poisson parameter λ approximates inter-arrival times between events relatively accurately.

Although the probability distribution of inter-event arrival times is described as a Poisson distribution herein, such a probability distribution function is presented purely for ease and clarity of description. In practice of the principles of the invention described herein, any discrete event probability function may be employed. As one example, a "Poisson mixture" (i.e., a linear combination of Poisson distributions) may be used. Those skilled in the art will understand, in view of this specification, that any other discrete event probability function that corresponds to available or likely tap data may be used.

When processing tracefiles 400, the first characteristic may be implemented in the following manner. The number of nodes, n, in network 200 may be obtained from tracefile 400. To represent the "event-centric" state of the network 200 as a function of time, a matrix T(t) may be defined:

$$T(t) = (t_i, \Delta t_i^*) i = 1, \ldots n, \quad (1)$$

where $T(0)=0$, $t_i^*$ is the arrival time 410 of the most recent event (ending<t) for node i 420, and $\Delta t_i^*$ is the corresponding duration (packet length) 430. From an implementation standpoint, the matrix T may be updated on a per event basis by filling an appropriate row of T (e.g., with the data from tracefile 400.

From a mathematical perspective, and with reference to T, $e_k$ may be an event that occurs at time $t_k$ from source node $n_k$ 210. Using this terminology, the time interval $\tau_i^k$ between the end of the transmission of the last event from node i until time $t_k$ may be defined as:

$$T_k^i = t_k - [t_i + \Delta t_i] \equiv t_k - (T(t_k))_i^* [1,1]^{transpose} \quad (2)$$

Then a weight $W^i_{ek}$ (between 0 and 1) that quantifies the likelihood that this event $e_k$ is a reaction to a prior event from node i as follows:

$$W_{ek}^1 \equiv W(\tau_k^i) = \begin{cases} e^{-\lambda \tau_k^i} & \text{if } \tau_k^i > 0 \\ 0 & \text{otherwise} \end{cases} \quad (3)$$

The first case of $W_{ek}^i$ above corresponds to assigning an exponentially decaying ($\lambda > 0$) weight according to how much time has transpired since node i last transmitted, that is, the time interval $\tau_i^k$. The second case of $W_{ek}^i$ above ensures causality (i.e., one node may not react to a second node before the second node finishes transmitting). Thus, a weight of zero is assigned when the time interval $\tau_i^k$ is less than 0 (i.e., when there is some overlap in transmission duration).

The constant Poisson parameter λ may be estimated by dividing the total number of events in a batch of tracefile data by the corresponding time duration of that batch to obtain the average inter-arrival time for the batch of data. The parameter λ may be estimated reasonably well by this calculated average inter-arrival time.

Figure 5:
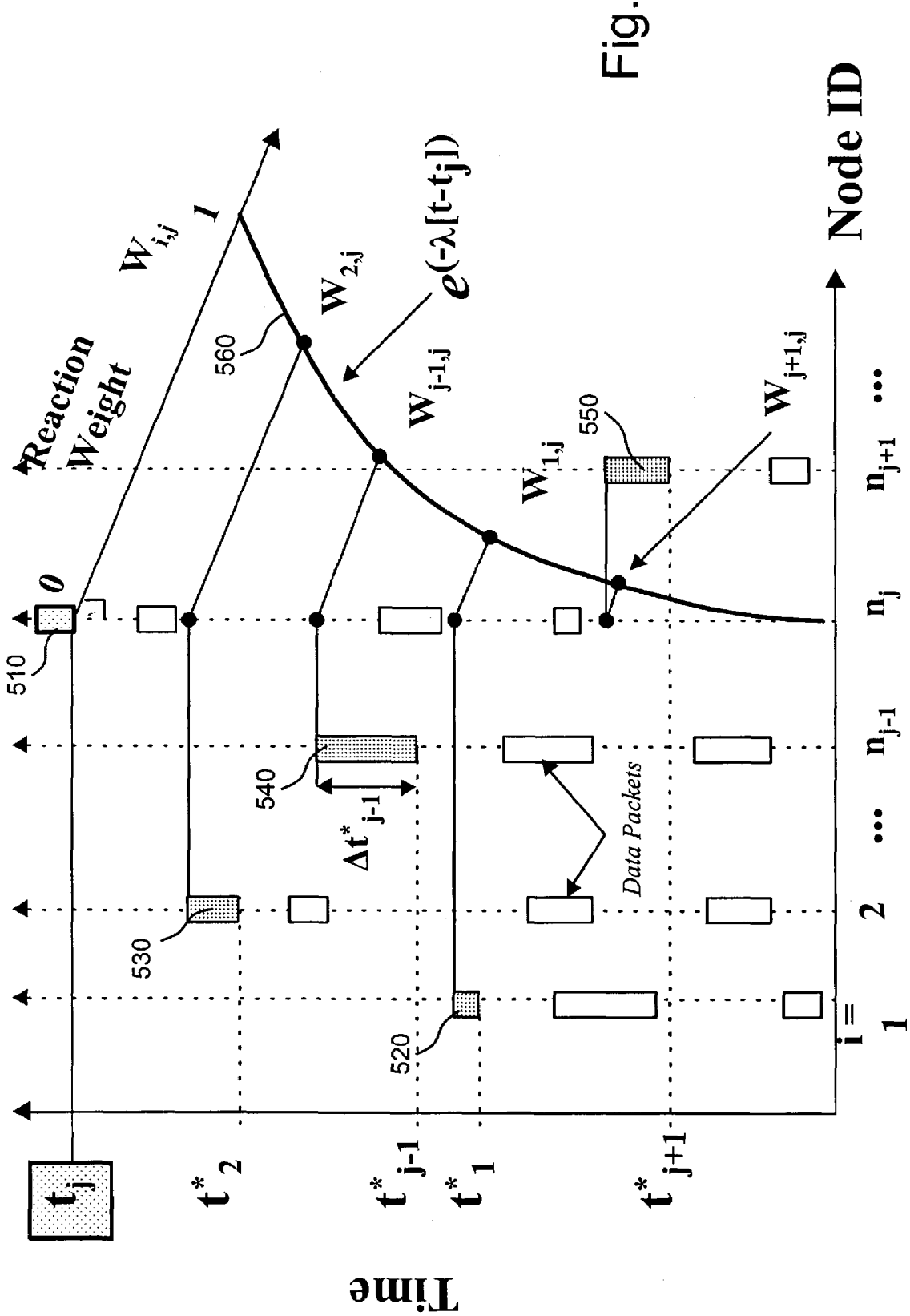
FIG. 5 is plot of arrival times for different nodes that illustrates the generation of weights for one chunk arrival event.

FIG. 5 is plot of chunk arrival times for different nodes that illustrates the generation of weights for one chunk arrival event. The arrival event of interest $e_j$ 510 occurs at time $t_j$, and its source was node $n_j$. Earlier events from source node $n_j$ and other nodes (e.g., $n_1$ to $n_{j-1}$, $n_{j+1}$, etc.) are shown as rectangles beginning and ending at certain times above their respective nodes. The most recent chunk arrival events $e_1$, $e_2$, $e_{j-1}$, and $e_{j+1}$ from other nodes $n_1$, $n_2$, $n_{j-1}$, and $n_{j+1}$ are shaded and respectively labeled 520, 530, 540, and 550.

Curve/function 560 conceptually illustrates the calculation of weights $We_k^i$ using equation 3 above. Curve/function 560 is shown in a third "weight" dimension along the vertical line corresponding to node $n_j$ and extending "upward" out of the page. Each of events' $e_1$, $e_2$, $e_{j-1}$ and $e_{j+1}$ ending times may be projected over to node $n_j$'s time line, and the time difference between their ending times and the beginning of event $e_j$, (t–$t_j$), may be calculated. These time differences may be used to calculate weights $We_k^i$ using equation 3.

As illustrated in FIG. 5, the highest weight $W_{2,j}$ (e.g., closest to the upper bound of 1 for $We_k^i$) is assigned to the most recent chunk arrival event $e_2$ 530 from node $n_2$. Similarly, the lowest weight $W_{j+1,j}$ (e.g., closest to the lower bound of 0 for $We_k^i$) is assigned to the least recent chunk arrival event $e_{j+1}$ 550 from node $n_{j+1}$. It should be noted that event $e_j$ receives a weight of zero from equation 3, because there is no time lapse from itself. In this manner, a set of weights $We_k^i$ is generated for each chunk arrival $e_j$ in tracefile 400 (or some batch of data within tracefile 400). Because these weights $We_k^i$ correspond to a single event $e_j$, they may be termed "per-event weights."

Per-event probability vectors may be used to identify the "reaction to" probabilities for a given event (i.e., the probabilities that the given event is a "reaction to" the most recent events with other source nodes). Per-event probability vectors may be obtained from the per-event weights calculated above by normalizing Equation 3 to obtain the following equation.

$$[p_1^e, p_2^e, \ldots p_n^e] = \frac{[W_1^e, W_2^e, \ldots W_n^e]}{\sum_{i=1}^{n} W_e^i} \quad (4)$$

The per-event probability vectors may provide an instantaneous measure of how likely any event is to have been caused by a certain node. Though such "local" information may be valuable in certain situations, it may not provide the time-integrated information suitable for determining steady-state flow information and/or network topology.

A more "global" data product, "cumulative probability matrices," may be obtained in a time-integrated manner from a given batch of data from tracefile 400. For a sequence of events, a probability matrix may be updated in an iterative manner. Convergence of this matrix reveals any underlying, persistent communications topology of network 200. The set of all transmission events in a batch may be defined as C. Similarly, the set of transmission events in set C with node i as the transmitter may be defined as $C_i$. The cumulative probability, $p_{ij}$, that a node j sends data to node i may be defined as:

$$p_{ij} = \frac{1}{|C_i|} \sum_{e \in C_i} \frac{W_e^j}{\sum_{l=1}^{n} W_e^l} \quad (5)$$

Where $W_e^i$, the likelihood that the event e is a reaction to a prior event from node j, may be calculated from Equation 3.

FIG. 6 illustrates a cumulative probability matrix P 600 among nodes 210 in the network 200. Formation of matrix P 600 assumes that the number of nodes n is constant, at least over the batch of data from tracefile 400.

Cumulative probability matrix P 600 may be incrementally generated from tracefile 400 as follows. When processing the next event e in the set of events C, for example the $m^{th}$ event of $C_i$ (i.e., the $m^{th}$ transmission from node i in C), the $i^{th}$ row in matrix P 600 may be updated as follows:

$$p'_{ij} = \frac{1}{m}\left((m-1)p_{ij} + \frac{W_e^j}{\sum_{l=1}^{n} W_e^l}\right), \forall\, 1 \le j \le n, \quad (6)$$

where $p_{ij}'$ is the new, incremented value of $p_{ij}$.

After its generation from the set of events C, the cumulative probability matrix P 600 enables at least two useful measures that may be used in establishing internode links. These measures may be seen by examining rows and columns of matrix P 600 as independent entities. A given row of matrix P 600, such as $(P)_{aj}$ (j=1 . . . n), may illustrate the likelihoods of data flow from nodes j to a node of interest. Conversely, a given column of matrix P 600, such as $(P)_{ib}$ (i=1 . . . n), may illustrate the likelihoods of data flow from a node of interest b to the remaining nodes 1.

Once the cumulative probability matrix P 600 has been generated, a threshold detection operation over the matrix P 600 may produce a probable routing table among the nodes 210 in network 200 (or that portion of the network 200 that was used to generate P 600). Thus, the steady-state topology (i.e., set of active links) of network 200 may be determined. A suitable threshold T for producing probable links may be discovered by those skilled in the art without undue experimentation. One threshold T that was found to be experimentally useful was around 0.2, but higher or lower thresholds between 0 and 1 may be used, such as thresholds in a range from about 0.1 to about 0.3.

Thus, the topology of network 200 may be determined by applying a probability threshold to cumulative probability matrix P 600. The resulting set of links occurred among nodes 210 during the period of time over which the cumulative probability matrix P 600 was iteratively formed.

FIG. 7 illustrates exemplary iterative processing to generate and update the cumulative probability matrix 600. First, a chunk arrival event (e.g., arrival event of interest $e_j$ 510) may be chosen [act 710] from a data set. The set of most recent chunk transmissions (e.g., 520-550) from nodes 210 other than the source node 210 associated with the chosen arrival event may be determined [act 720]. This set of most recent chunk transmissions may be weighted (e.g., $We_k^i$) according to the elapsed time between the chunk transmissions and the chosen arrival event [act 730]. Equation 3 or curve/function 560, for example, may be used to accomplish this weighting of most recent arrivals, by measuring from the ending times of the arrivals.

Probability matrix 600 may be updated with the weights associated with the chunk arrival event, as described by Equation 6 [act 740]. It should be noted that the weights $We^{ki}$ may be normalized to generate probabilities before updating probability matrix 600. If the data set to be analyzed is not complete [act 750], a next chunk arrival event (e.g., arrival event of interest $e_{j+1}$ 510) may be chosen, and acts 710-740 may be repeated for that next chunk arrival event. Acts 710-740 may be repeated for all chunk arrivals in the set of data until the last arrival in the set is processed [act 760]. Depending on network traffic, a relatively large data set (e.g., about 10 seconds worth of chunk arrival data) may need to be processed before probability matrix 600 converges to a stable state.

Simulations were performed to compare performance of the above-described topology detection scheme by comparing the calculated link detections against corresponding "ground-truth" obtained from data used in the simulations. Both aggregations of taps 220 and individual taps 220 were evaluated in simulations. Route discovery was found to be generally more accurate in the global/aggregate case, because individual taps 220 generally do not cover a rich enough topology for high detection accuracy.

The above-described topology detection scheme may correctly detect 65-100% of the links in the network 200, including cases without MAC-layer feedback. The false alarm rate of the scheme is also low in all cases that involve MAC-layer feedback. For the global cases (i.e., all of network 200), the false alarm rate may be in the range of 0-4.6%. The highest false alarm rate among all cases using MAC-layer feedback was found to be 27% for a tracefile 400 generated from a single tap 220.

Egress Node Discovery Processing

An "egress node" may be defined as a node 210 that does not communicate with other nodes that are detected by the probe(s) 220. Egress nodes 210 may be sources of data chunks, sinks of data chunks, and/or gateways for wireless network 200 to other networks. Egress nodes 210 may be found by using the observation that the longer it takes for a recorded reaction to an event, the more likely the event is a response to a node 210 that is not recorded.

$W_e$ may be defined as the maximum weight assigned for a given event e, as indicated by the following equation.

$$W_e = \max[W_e^1, W_e^2, \ldots W_e^n] \quad (7)$$

$W_e$ thus corresponds to the minimum time lag between event e and the most recent event from another source node 210. The "egress weight" may then be defined as:

$W_e^{egress} = 1 - W_e$. So, the egress weight may be conceptualized as inversely proportional to the minimum time lag between event e and the most recent other event.

The egress weight thus defined, a dimension corresponding to the egress likelihood may be added to Equation 5 as follows:

$$p_{ij} = \frac{1}{|C_i|} \sum_{e \in C_i} \frac{W_e^j}{W_e^{egress} + \sum_{l=1}^{n} W_e^l}, \forall\, 1 \le j \le n \quad (8)$$

$$p_{i(n+1)} = \frac{1}{|C_i|} \sum_{e \in C_i} \frac{W_e^{egress}}{W_e^{egress} + \sum_{l=1}^{n} W_e^l}. \quad (9)$$

FIG. 8 illustrates a cumulative probability matrix $P_e$ 800 including egress probabilities $p_{n,(n+1)}$ among nodes 210 in the network 200. Threshold detection over the last column of matrix $P_e$ 800 provides good egress node detection. The other columns and rows of matrix $P_e$ 800 may be used to determine the topology of network 200 as explained above with respect to matrix P 600.

Simulations were performed to evaluate the above scheme's egress node detection performance. A fixed threshold of 0.3 was used in all egress detection simulation cases. The detection scheme correctly detects 66.7-100% of egress nodes. The false alarm rate, however, varies widely, being as high as 86.9% in one case. The false alarm rate tends to be higher in cases with few or no egress transmissions. For example, the global cases (i.e., for the entire network 200) have no egress transmissions by definition.

CONCLUSION

Methods and systems consistent with the principles of the invention may discover network topology by examining elapsed times between one chunk arrival and the most recent chunk arrivals from other nodes on a per-event basis. The most recent chunk arrivals from the other nodes may be weighted so that more recent chunks are weighted higher than less recent chunks.

The foregoing description of preferred embodiments of the invention provides illustration and description, but is not intended to be exhaustive or to limit the invention to the precise form disclosed. Modifications and variations will be apparent to those skilled in the art in light of the above teachings or may be acquired from practice of the invention.

Moreover, the acts in FIGS. 3 and 7 need not be implemented in the order shown; nor do all of the acts need to be performed. Also, those acts which are not dependent on other acts may be performed in parallel with the other acts.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method of determining topology of a network, comprising:
    obtaining a data set including times of arrival, durations, and source nodes for chunks of data in the network;
    identifying most recent chunks of data arriving from source nodes other than a source node of interest in which arrival times of the most recent chunks occur before a chunk arrival time associated with the source node of interest;
    calculating weights for the other source nodes based on time differences between the chunk arrival time associated with the source node of interest and the most recent chunks of data;
    updating a probability matrix based on the weights for the other source nodes;
    repeating the identifying, calculating, and updating for other times of arrival and associated source nodes of interest in the data set;
    determining the topology of the network from the probability matrix; and
    outputting the topology of the network.

2. The method of claim 1, wherein the network is a wireless network.

3. The method of claim 1, wherein the identifying includes:
    determining one most recent chunk of data for each of the other source nodes.

4. The method of claim 1, wherein the calculating includes:

determining the time differences based on ending times of the most recent chunks of data.

5. The method of claim 4, wherein the ending times are determined from respective times of arrival and durations of the most recent chunks of data.

6. The method of claim 1, wherein the calculating includes:
calculating the weights using a function of time whose value generally decreases with increasing time.

7. The method of claim 6, wherein the function is a monotonically decreasing function of time.

8. The method of claim 1, wherein the updating includes:
normalizing the weights to obtain a set of probabilities for the other source nodes.

9. The method of claim 1, wherein the determining includes:
applying a threshold function to the probability matrix.

10. The method of claim 1, further comprising:
finding egress nodes in the network from the probability matrix.

11. A method of determining routing information among nodes in a network, comprising:
obtaining a set of times of arrival and corresponding source nodes for chunks of data in the network;
determining intervening times between one chunk of data from one node and recently arriving chunks of data from other nodes;
generating routing probabilities between the one node and the other nodes using the intervening times; and
outputting the routing probabilities.

12. The method of claim 11, wherein the determining includes:
determining the intervening times between the one chunk of data and one most recent chunk of data for each of the other nodes.

13. The method of claim 11, wherein the obtaining includes:
obtaining durations of the chunks of data in the network.

14. The method of claim 13, wherein the determining includes:
calculating the intervening times based on the times of arrival and the durations of the most recent other chunks of data from the other nodes.

15. The method of claim 11, wherein the generating includes:
assigning weights to respective other nodes, the weights varying inversely to respective intervening times associated with the respective other nodes.

16. The method of claim 15, wherein the weights decrease exponentially with increasing intervening time.

17. The method of claim 11, wherein the generating further includes:
normalizing the assigned weights to generate the routing probabilities.

18. A method of determining routing information among nodes in a network, comprising:
obtaining times of arrival and corresponding source nodes for chunks of data in the network;
assigning weights to a set of chunks of data based on respective time differences between the set of chunks of data and one chunk of data;
updating a set of estimated routing information among the nodes in the network based on the assigned weights; and
outputting the updated estimated routing information.

19. The method of claim 18, wherein the respective times are measured from ends of respective chunks of data in the set and a time of arrival of the one chunk of data.

20. The method of claim 18, further comprising:
choosing a new chunk of data as the one chunk of data; and
repeating the assigning weights and updating a set of routing information for the new chunk of data.

21. A computer-readable medium that stores instructions executed by one or more processors to perform a method for determining routing information among nodes in a network, comprising:
instructions for obtaining a set of times of arrival and corresponding source nodes for chunks of data in the network;
instructions for assigning weights to a set of chunks of data based on respective time differences between the set of chunks of data and one chunk of data; and
instructions for updating a set of routing information among the nodes in the network based on the assigned weights.

\* \* \* \* \*